United States Patent Office 3,413,384
Patented Nov. 26, 1968

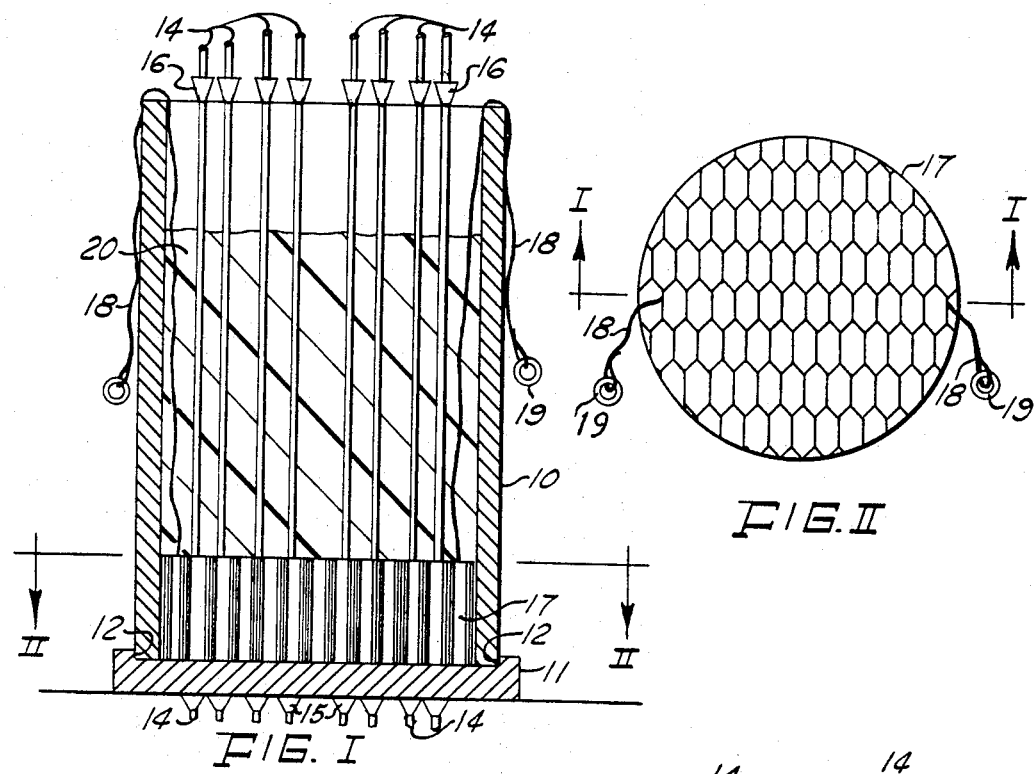
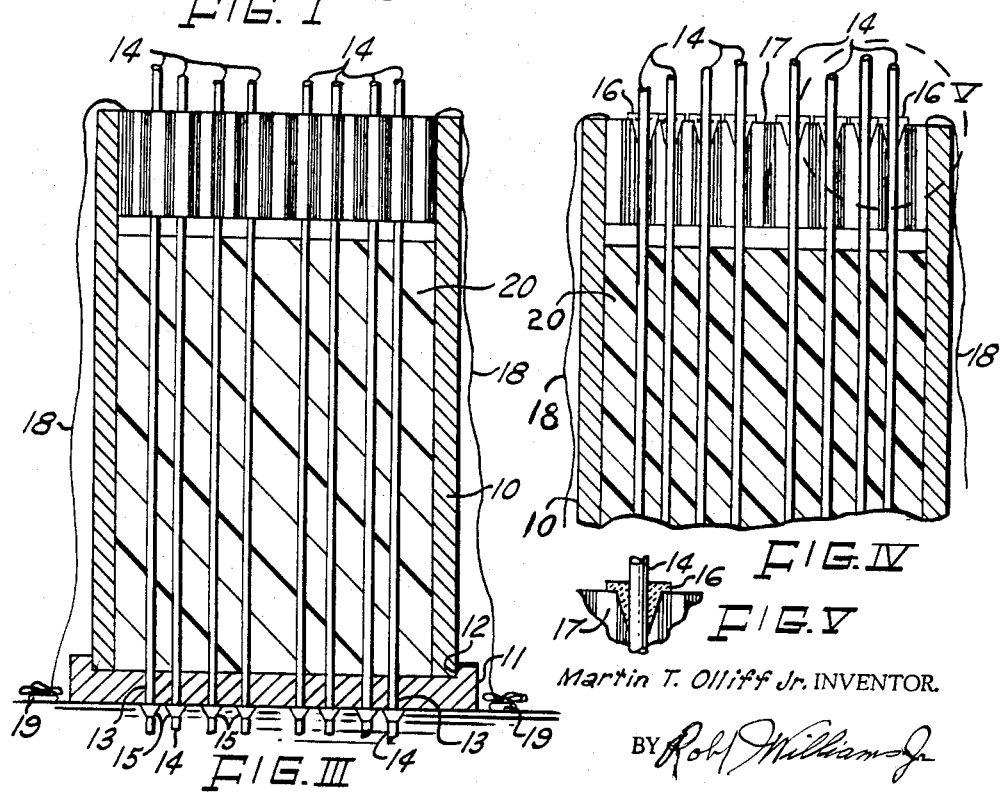

3,413,384
METHOD OF OBTAINING UNIDIRECTIONAL ORIENTATION OF MONOFILAMENTS IN CURABLE ELASTOMERIC MATERIALS
Martin T. Olliff, Jr., Huntsville, Ala., assignor to Thiokol Chemical Corporation, Bristol, Pa., a corporation of Delaware
Filed Apr. 24, 1967, Ser. No. 633,180
3 Claims. (Cl. 264—3)

ABSTRACT OF THE DISCLOSURE

A method of directionally orienting monofilaments in an uncured solid propellant or other curable materials within a container, so that the monofilaments extend longitudinally of the container in spaced relation to each other and parallel to the center line of the container.

Background of the invention

*Field of the invention.*—It has been determined that metal monofilaments, if added to an uncured solid propellant, will increase the proficiency of the solid propellant as to burning rates, impulse etc. It has also been found that when the monofilaments are added to the uncured solid propellant in the conventional manner, there is no orientation of the monofilaments and thus the solid propellant, while it is increased in efficiency, could still be further improved if the monofilaments were directionally oriented so that they would all extend longitudinally of the rocket motor case in spaced relation to each other and in parallel relation to the lonigtudinal center line of the motor case. The present invention, therefore, relates to a method for directionally orienting the monofilaments so that the efficiency of the solid propellant is greatly increased over a solid propellant having therein monofilaments that are not directionally oriented.

*Description of the prior art.*—At the present time it is conventional to feed the monofilaments to a solid propellant while it is being mixed, but no efforts prior to the method of the present invention have been made to oriented the monofilaments so that such monofilaments will be retained in the solid propellant in fixed parallel spaced directional orientation to each other and to the motor case.

Summary of the invention

This invention, therefore, relates to improvements in methods for directionally orienting monofilaments in an uncured solid propellant or other curable materials whereby the monofilaments are directionally oriented to further increase the efficiency of a solid propellant rocket motor.

The addition of metal monofilaments to an uncured solid propellant is conventional, but such addition has not been made so that the monofilaments are directionally oriented. Test firing of solid propellant rocket motors have definitely established the fact that if the monofilaments are directionally oriented in the solid propellant, the efficiency of the solid propellant rocket motor is greatly increased over a solid propellant rocket motor wherein the monofilaments are randomly positioned in the solid propellant without any effort to directionally orient the monofilaments.

It is an object of this invention, therefore, to provide a method for directionally orienting monofilaments in an uncured solid propellant or other curable materials.

It is another object of the invention to provide an orienting device whereby when the device is moved longitudinally of the motor case of the solid propellant rocket motor, the monofilaments in the solid propellant will be directionally oriented in spaced relation to each other and parallel to the longitudinal center line of the rocket motor case.

With the above and other objects and advantages in view, as will appear to those skilled in the art, the invention consists of the method for directionally orienting monofilaments in a solid propellant as will be more clearly set forth in the following description when considered in conjunction with the accompanying drawing in which:

Brief description of the drawing

FIGURE I is a longitudinal sectional view of a rocket motor case, showing the orienting device in position before it has been moved longitudinally of the rocket motor case to directionally orient the monofilaments in an uncured solid propellant that has been cast into the rocket motor case;

FIGURE II is an elevational plane view of the orienting device per se and is taken approximately on the line II of FIGURE I;

FIGURE III is a view similar to FIGURE I wherein the orienting device has been moved the entire length of the motor case to directionally orient the monofilaments;

FIGURE IV is a fragmentary detailed sectional view of the aft end of the motor case, showing the monofilaments within the orienting device and the limiting elements on the monofilaments which limit the movement of the orienting device and retain the monofilaments under tension until the solid propellant has been cured; and FIGURE V is a detailed sectional view of one of the limiting elements, as shown within the dotted circle V in FIGURE IV.

Description of the preferred embodiments

Referring more in detail to the drawing wherein like parts are designated by like reference numerals, the reference numeral 10 is used to designate a motor case for a solid propellant rocket motor.

The rocket motor case 10 is of conventional design and may be formed of any size that is required to meet the requirements of a specified solid propellant rocket motor.

The rocket motor case 10 in this instance is of substantially opened end cylindrical formation and the nozzle and head end, not shown, for the rocket motor case 10 are rigidly secured to the aft and fore open ends of the rocket motor case 10 in any conventional manner.

In carrying out the invention a head plate 11 is utilized and centrally of the head plate 11 there is provided a circular cavity 12 in which is positioned one end of the rocket motor case 11. The head plate 11 is provided with a plurality of openings 13 which are arranged in circular spaced rows or such openings can be arranged to assume any other geometrical designs that may be found necessary to properly orient the monofilaments 14 that have one end thereof inserted into the openings 13, as shown in FIGURE III.

Positioned on the lower ends of the monofilaments 14 that are inserted into the openings 13 outwardly of the head plate 11 and adapted to abut the head plate 11, as will be later described, are stops or limiting elements 15 and similar stops or limiting elements 16 are secured to the opposite upper free ends of the monofilaments 14 for a purpose to be later described.

After the lower ends of the monofilaments 14 have been inserted into the openings 13 in the head plate 11 and the stops or limiting elements have been positioned thereon, as previously described, a circular honey-comb orienting device 17 is lowered into the rocket motor case 10 by means of cables 18 having rings 19 secured to the free ends thereof. The cables 18 may be secured to the orienting device 17 in any conventional manner. After the orienting device 17 has been lowered into the motor case 10 and is resting on the upper surface of the head plate 11, the stops or limiting elements 16 are secured to the upper free ends of the monofilaments 14.

In FIGURE I, for purposes of illustration, the monofilaments 14 are shown in orderly fashion, but in their usual position prior to the use of the orienting device 17, they would be merely a mass of monofilaments extending outwardly of the rocket motor case 10 over the open upper edge thereof in a very unorderly manner.

In the method embodying the invention, after the monofilaments 14 are in position, the assembly, including the previously described elements, is placed in a vacuum casting assembly and the uncured liquid solid propellant 20 is then cast into the motor case 10.

While the motor case 10 and the solid propellant 20 are still under vacuum, the orienting device 17 is pulled upwardly through the uncured liquid solid propellant 20 by means of the cables 18. The uncured liquid solid propellant will pass through the honeycomb structure of the orienting device 17 and the monofilaments 14 will be unidirectionally oriented, as shown in FIGURE III.

The orienting device 17 will be pulled upwardly until it engages the stops or limiting elements 16 in the honeycomb structure, at which time sufficient tension is placed on the monofilaments 14 to maintain them in position until the uncured liquid solid propellant has been properly cured. The stops or limiting elements 15 will prevent the lower ends of the monofilaments 14 from being pulled through the openings 13 in the head plate 11 and the stops or limiting elements 16 will prevent the upper free ends of the monofilaments 14 from being pulled through the orienting device 17.

After the solid propellant 20 has been cured, the lower ends of the monofilaments 14 are released from the stops or limiting elements 15 and the head plate 11 is removed from the motor case 10, and the lower free ends of the monofilaments 14 are clipped off even with the surface of the solid propellant 20. The upper free ends of the monofilaments 14 are released from the stops or limiting elements 16 and the orienting device 17 is then removed from the motor case 10 and the upper free ends of the monofilaments 14 are clipped off even with the surface of the solid propellant 20.

The monofilaments 14 are thus unidirectionally oriented in the solid propellant 20 in the motor case 10 and the motor case 10 is now in condition to have the head end and nozzle, not shown, secured thereto in any conventional manner.

There has thus been described a method for obtaining unidirectional orientation of monofilaments in an uncured liquid solid propellant and it is believed that such method and the elements utilized to carry out the method will be apparent to those skilled in the art, it also being understood that any variations in the method and the parts utilized to carry out the method may be adhered to providing such variations fall within the spirit of the invention and the scope of the appended claims.

Having thus described the invention what is claimed as new and desired to be secured by Letters Patent is:

1. A method for obtaining unidirectional orientation of monofilaments in an uncured liquid solid propellant in a rocket motor case comprising the steps of placing a head plate having a plurality of openings therein on one end of the motor case, inserting the lower ends of the monofilaments in the openings in the head plate, placing limiting elements on the lower ends of the monofilaments outwardly of the head plate, placing an orienting device into the end of the motor case opposite to the end having the head plate thereon, passing the monofilaments through the orienting device, positioning limiting elements on the upper free ends of the monofilaments, placing the motor case in a vacuum casting assembly, casting uncured liquid solid propellant into the motor case, pulling the orienting device upwardly through the uncured liquid solid propellant until it engages the limiting elements on the upper free ends of the monofilaments and tension is placed on the monofilaments and then curing the uncured liquid solid propellant into solid form.

2. The method as in claim 1 wherein the orienting device is of a honeycomb structure.

3. The method as in claim 1 wherein the additional steps of removing the head plate and orienting device from the motor case is accomplished and the free ends of the monofilaments are clipped even with the surface of the opposite ends of the cured solid propellant.

References Cited
UNITED STATES PATENTS

| | | | |
|---|---|---|---|
| 2,197,465 | 4/1940 | Brunetti | 264—328 |
| 3,109,374 | 11/1963 | Rumbel et al. | 264—3 |
| 3,261,255 | 7/1966 | Glick et al. | 264—3 |

CARL D. QUARFORTH, *Primary Examiner.*

M. J. McGREAL, *Assistant Examiner.*